United States Patent
Wymore

(10) Patent No.: US 10,207,649 B2
(45) Date of Patent: Feb. 19, 2019

(54) MULTI-AXIS ROOF-RACK MOUNTING SYSTEM

(71) Applicant: Iddea California, LLC, Brea, CA (US)

(72) Inventor: Timothy J. Wymore, Yorba Linda, CA (US)

(73) Assignee: Iddea California, LLC, Brea, CA (US)

( * ) Notice: Subject to any disclaimer, the term of this patent is extended or adjusted under 35 U.S.C. 154(b) by 0 days.

(21) Appl. No.: 15/337,264

(22) Filed: Oct. 28, 2016

(65) Prior Publication Data

US 2018/0118127 A1    May 3, 2018

(51) Int. Cl.
| | |
|---|---|
| B60R 9/058 | (2006.01) |
| B60R 9/04 | (2006.01) |
| B60R 9/045 | (2006.01) |
| B60R 9/042 | (2006.01) |
| B60R 9/052 | (2006.01) |
| B60R 9/048 | (2006.01) |

(52) U.S. Cl.
CPC ........... *B60R 9/058* (2013.01); *B60R 9/04* (2013.01); *B60R 9/042* (2013.01); *B60R 9/045* (2013.01); *B60R 9/048* (2013.01); *B60R 9/052* (2013.01)

(58) Field of Classification Search
CPC  B60R 9/04; B60R 9/045; B60R 9/042; B60R 9/052; B60R 9/058; Y02E 10/47; H02S 20/23; H02S 20/00; H02S 20/30
USPC ........... 248/183.2, 286.1, 503; 224/321, 322, 224/325, 326; 52/173.3
See application file for complete search history.

(56) References Cited

U.S. PATENT DOCUMENTS

| | | | | |
|---|---|---|---|---|
| 2,804,248 A | * | 8/1957 | Samuels | B60R 9/058 224/329 |
| 3,719,313 A | * | 3/1973 | Tischler | B60R 9/04 224/309 |
| 4,432,479 A | * | 2/1984 | Graber | B60R 9/058 224/322 |
| 4,489,868 A | * | 12/1984 | Thirion | B60R 9/045 224/321 |
| 4,721,239 A |   | 1/1988 | Gibbs, III et al. | |
| 5,464,140 A | * | 11/1995 | Hill | B60R 9/045 224/315 |
| 5,829,654 A |   | 11/1998 | Weger, Jr. et al. | |
| 6,131,781 A | * | 10/2000 | Murray | B60R 9/042 224/309 |
| 6,264,082 B1 | * | 7/2001 | Lindell | B60R 9/058 224/322 |
| 8,245,460 B2 | * | 8/2012 | Yamanaka | F24J 2/4614 126/623 |

(Continued)

*Primary Examiner* — Jonathan Liu
*Assistant Examiner* — Taylor L Morris
(74) *Attorney, Agent, or Firm* — Stetina Brunda Garred and Brucker

(57) ABSTRACT

A multi-axis roof-rack mounting system includes a bracket member and a support member coupled to the bracket member. The bracket member includes a middle portion and two arm members connected to and extending upwardly from opposing lateral edges of the middle portion. The support member includes a curved portion having an elongate opening configured to allow lateral movement of a fastener passing through the support member, one or more saddle members moveably engaged with the support member, and a clasp member. The clasp member is coupled to the fastener and configured to be receivable within a rail. The bracket member is securable to a roof of a vehicle.

8 Claims, 3 Drawing Sheets

(56) References Cited

U.S. PATENT DOCUMENTS

| | | | |
|---|---|---|---|
| 8,424,255 B2* | 4/2013 | Lenox | F24J 2/5245 |
| | | | 52/173.3 |
| 8,511,009 B2* | 8/2013 | Kobayashi | E04D 1/30 |
| | | | 52/173.3 |
| 8,763,978 B2* | 7/2014 | Newman | F24J 2/5205 |
| | | | 248/424 |
| 2014/0109496 A1* | 4/2014 | Stapleton | E04D 13/00 |
| | | | 52/173.3 |

* cited by examiner

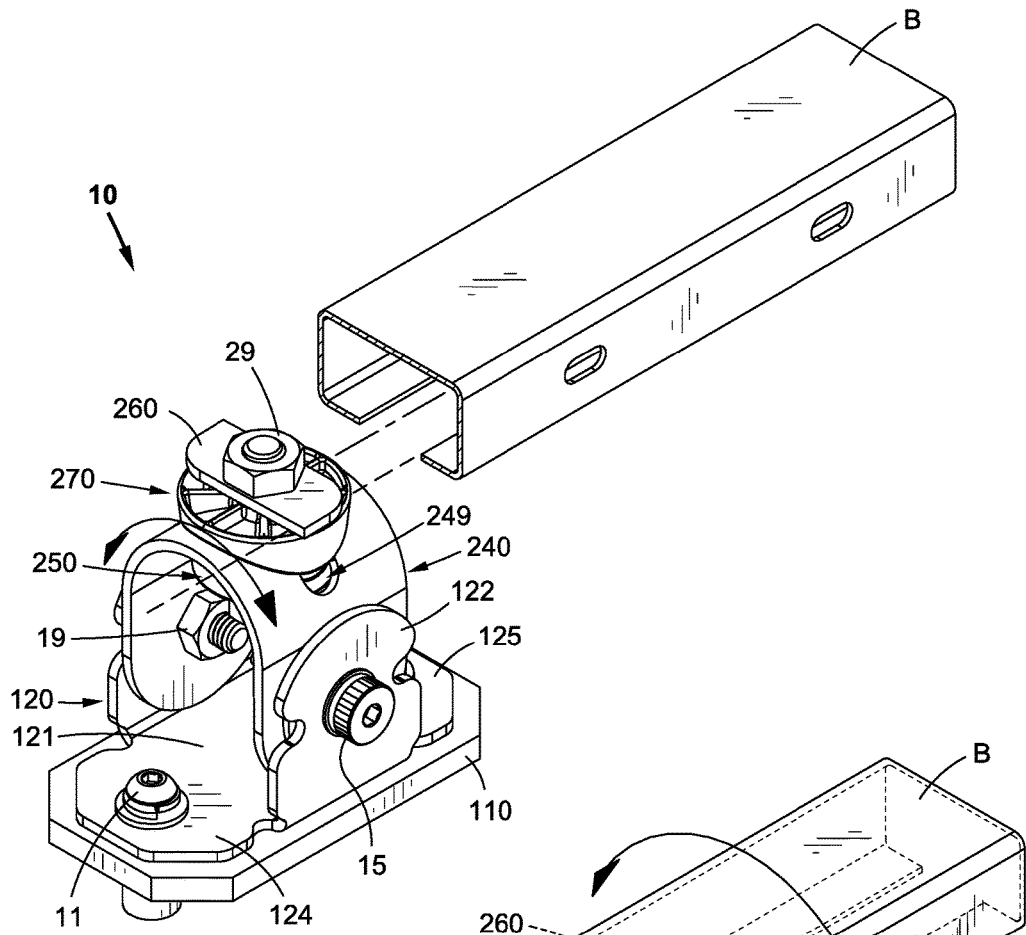
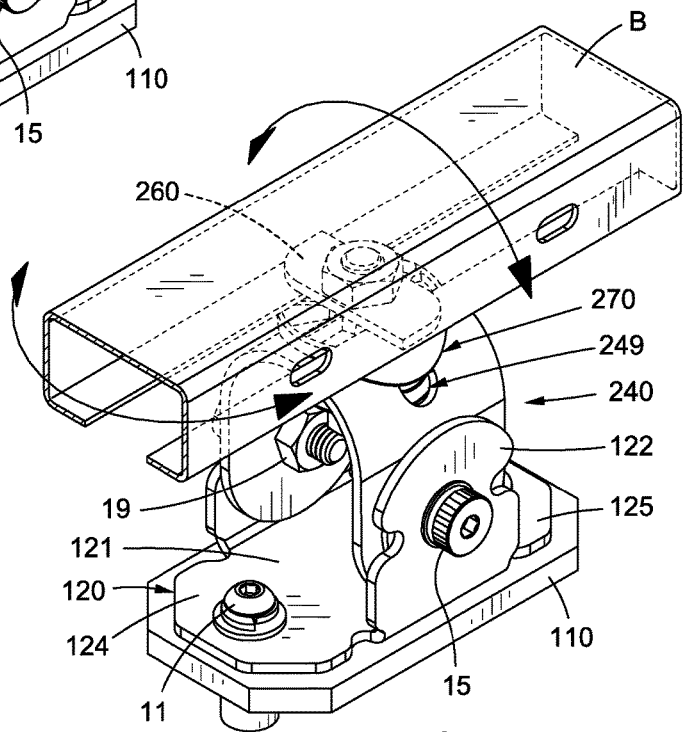

MULTI-AXIS ROOF-RACK MOUNTING SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

Technical Field

The present disclosure relates to roof-rack mounting brackets. More particularly, the present disclosure relates to a multi-axis roof-rack mounting system.

Discussion of Related Art

Vehicle roof racks are useful for additional cargo capacity and for transporting oversized objects that may not fit in the vehicle's cargo area volume such as in the typical car's trunk. Roof racks may be used for a variety of cargo including recreational items, luggage, equipment, or various carriers and containers. The use of roof racks allow users of automobiles, trucks, sports utility vehicles, and recreational vehicles to transport objects on the roof of the vehicle without reducing interior space for occupants, so passengers can travel comfortably. Roof racks may keep the inside of the motor vehicle cleaner and/or scuff-free while transporting articles on the vehicle's roof top.

Some vehicles are equipped with a roof rack installed by the vehicle manufacturer. A roof rack may include a pair of spaced parallel rails or load bars, fixedly attached to the vehicle's roof. The rails may be elevated a distance from the roof surface, generally three to five inches. Factory-installed roof racks generally come with either a raised side rail or a continuous side rail. Some vehicles come with pre-drilled installation points or other attachment points for the attachment of aftermarket roof racks.

Roof rack designs may support a variety of loads depending on rack size and vehicle application. Roof racks may be immobile and rigidly secured to the vehicle roof top such as factory-installed permanent roof racks. Roof racks designed for the everyday and off-road user may be provided with U-bolt mounting hardware or direct roof mounting kits. Roof racks may be mounted to a vehicle's factory rain gutters. Some of the gutter-mount base roof-rack systems come with built-in locking capability. Mounting systems for gutterless vehicles typically include artificial rain gutter plates that bolt to the sides of a vehicle roof and provide mounting points for gutter-mount roof-rack legs. Some vehicles have fittings for proprietary racks which mate with reinforced lugs in the roof.

A need exists for improved roof-rack mounting systems for sports utility vehicles, trucks, and other vehicles. There is a need for a secure mounting system for luggage trays, cargo boxes, cargo baskets, bike carriers, ski and snowboard racks, water sport carriers, and other cargo transportation systems.

BRIEF SUMMARY

According to an aspect of the present disclosure, a multi-axis roof-rack mounting system includes a bracket member and a support member coupled to the bracket member. The bracket member includes a middle portion and two arm members connected to and extending upwardly from opposing lateral edges of the middle portion. The support member includes a curved portion having an elongate opening configured to allow lateral movement of a fastener passing through the support member, one or more saddle members moveably engaged with the support member, and a clasp member. The clasp member is coupled to the fastener and configured to be receivable within a rail. The bracket member is securable to a roof of a vehicle.

The at least one saddle member may have a curved surface configured to moveably engage with a surface of the curved portion of the support member. The at least one saddle member may be coupled to the fastener passing through the support member. The at least one saddle member and the clasp member may be configured to allow a rail, when coupled therebetween, to be pivotably movable relative to the support member about a central longitudinal axis of the fastener.

The support member may include two opposing side portions connected to and extending from opposite ends of the curved portion. Each of the side portions of the support member may include an aperture. Each of the arm members of the bracket member may include an aperture. The apertures in the side portions of the support member may be aligned with the apertures in the arm members of the bracket member.

According to another aspect of the present disclosure, a multi-axis roof-rack mounting system includes a base portion and a neck portion coupled to the base portion. The base portion includes a bracket member including a first tab portion, a second tab portion, a middle portion extending between the first tab portion and the second tab portion, and two arm members connected to and extending upwardly from opposing lateral edges of the middle portion. The neck portion includes a support member, a first saddle member moveably engaged with the support member, a second saddle member moveably engaged with the support member, and a clasp member. The support member includes a curved portion having an elongate opening configured to allow lateral movement of a fastener passing through the support member. The clasp member is configured to be receivable within a rail. The base portion is adapted to be securable to a roof of a vehicle.

The first saddle member may have a curved surface configured to moveably engage with an inner surface of the curved portion of the support member. The second saddle member may have a curved surface configured to moveably engage with an outer surface of the curved portion of the support member.

An aperture in the first saddle member may be aligned with an aperture in the second saddle member. The first saddle member and the second saddle member may be coupled to the fastener passing through the support member. The second saddle member and the clasp member may be configured to allow a rail, when coupled therebetween, to be pivotably movable relative to the support member about a central longitudinal axis of the fastener. The second saddle member may include a first side, a second side, and an aperture defined by a tubular member extending from the first side to the second side. When a rail is coupled between the second saddle member and the clasp member, a bottom of the rail may be moveable atop a plurality of wall members extending between an outer perimeter of the second side and the tubular member of the second saddle member.

BRIEF DESCRIPTION OF THE DRAWINGS

These and other features and advantages of the multi-axis roof-rack mounting system embodiments disclosed herein will be better understood with respect to the following description and drawings, in which like reference numerals may refer to similar or identical elements throughout the description of the figures, and in which:

FIG. 2 is a perspective view of the multi-axis roof-rack mounting system of FIG. 1, shown with a rail aligned for mounting, in accordance with an embodiment the present disclosure;

FIG. 3 is a perspective view of the multi-axis roof-rack mounting system of FIG. 1, shown with a mounted rail, in accordance with an embodiment the present disclosure;

DETAILED DESCRIPTION

Figure 1:
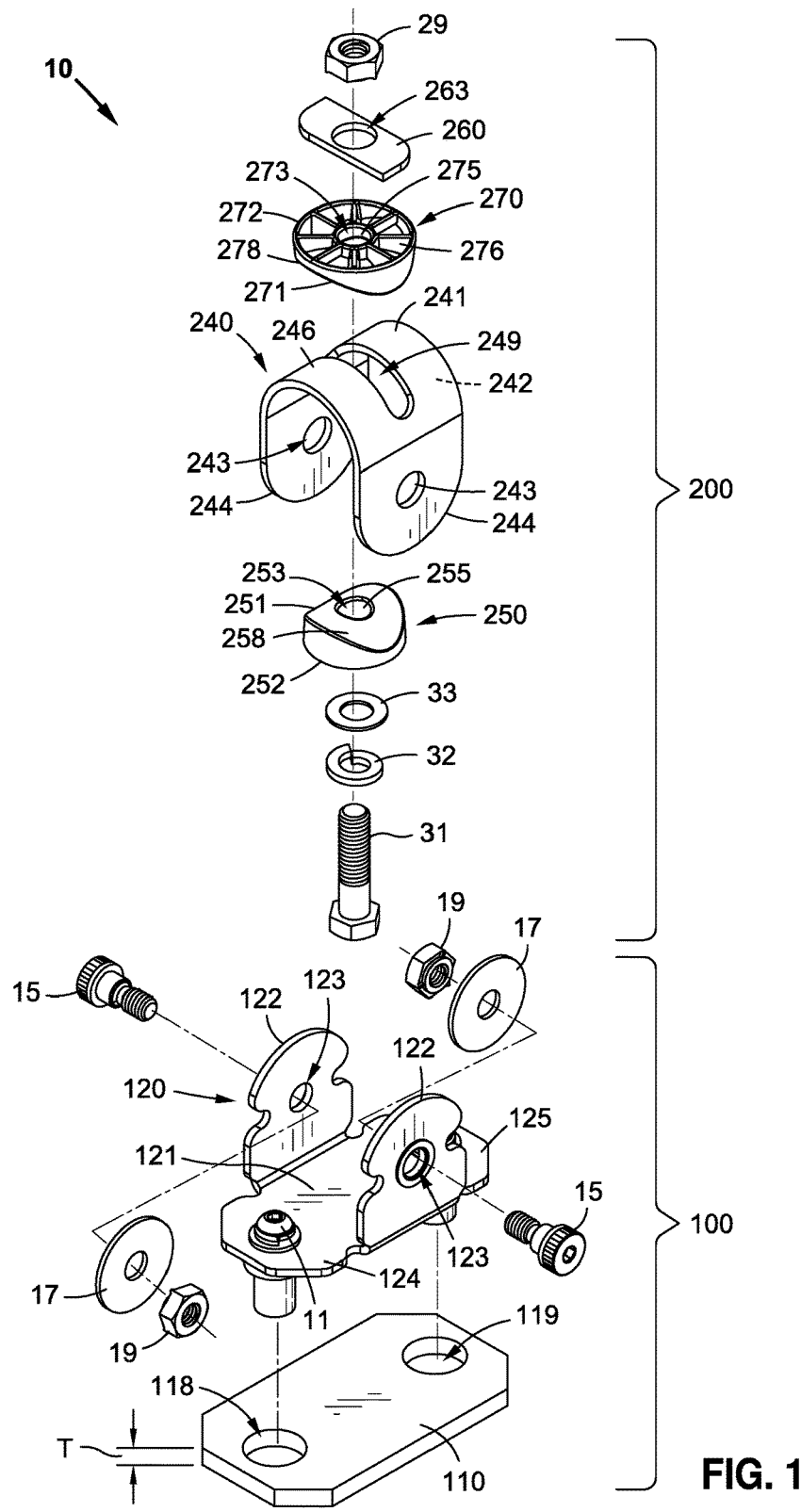
FIG. 1 is a perspective view of a multi-axis roof-rack mounting system, with parts separated, in accordance with an embodiment the present disclosure.

Hereinafter, embodiments of a multi-axis roof-rack mounting system are described with reference to the accompanying drawings.

This description may use the phrases "in an embodiment," "in embodiments," "in some embodiments," or "in other embodiments," which may each refer to one or more of the same or different embodiments in accordance with the present disclosure.

It is to be understood that the terminology used herein is for the purpose of describing particular embodiments only, and is not intended to be limiting. As used herein, the term "rail" generally refers to elongate load bars that may be aligned parallel to the centerline of the roof or transversely to it. As it is used in this description, "roof rack" is a general term which may refer to any cargo transportation system including one or more rails or attachable to one or more rails. For the purposes herein, the term "roof rack" may include luggage trays, cargo trays, cargo boxes, cargo baskets, bike carriers, ski and snowboard racks, water sport carriers, and other cargo transportation systems.

Various embodiments of the present disclosure provide a multi-axis roof-rack mounting system for various uses. Embodiments of the presently-disclosed multi-axis roof-rack mounting system may be adapted to be quickly and permanently secured to a variety of structures, e.g., roof of a vehicle. Embodiments of the presently-disclosed multi-axis roof-rack mounting system may be affixed to sports utility vehicles (SUVs), trucks, or other vehicles. Embodiments of the presently-disclosed multi-axis roof-rack mounting system may be adapted to detachably engage the body of a locking device, or lugs in the roof of a vehicle, etc. Those skilled in the art will recognize that the size and shape of the presently-disclosed multi-axis roof-rack mounting system, or parts thereof, may vary according to vehicle model, manufacturer, style of vehicle, etc.

In FIGS. 1-5, an embodiment of a multi-axis roof-rack mounting system 10 is shown for use with a motor vehicle, e.g., a sports utility vehicle or a truck. Various parts of the multi-axis roof-rack mounting system 10 may be formed of any of a variety of materials, including non-metallic and/or metallic materials. It is to be understood that the multi-axis roof-rack mounting system 10 may be installed and used on various types of vehicles and should not be construed to be limited to only SUVs or trucks.

The multi-axis roof-rack mounting system 10 includes a base portion 100 adapted to secure to the roof top of a vehicle (e.g., roof R shown in FIG. 5) and a neck portion 200 coupled to the base portion 100. The base portion 100 includes a bracket member 120, which may have a generally U-shaped cross-section. The bracket member 120 may include a plurality of members or portions. In an embodiment, as shown for example in FIGS. 1-3, the bracket member 120 includes a middle portion 121 extending between a first tab portion 124 and a second tab portion 125. Two arm members 122 may be connected to and extend upwardly from the opposing lateral edges of the middle portion 121. Those having ordinary skill in the art will recognize that the middle portion 121, the first tab portion 124, the second tab portion 125, and the arm members 122 may be integrally formed as a single unitary body. In an embodiment, each arm member portion 244 includes an aperture 123.

Figure 5:
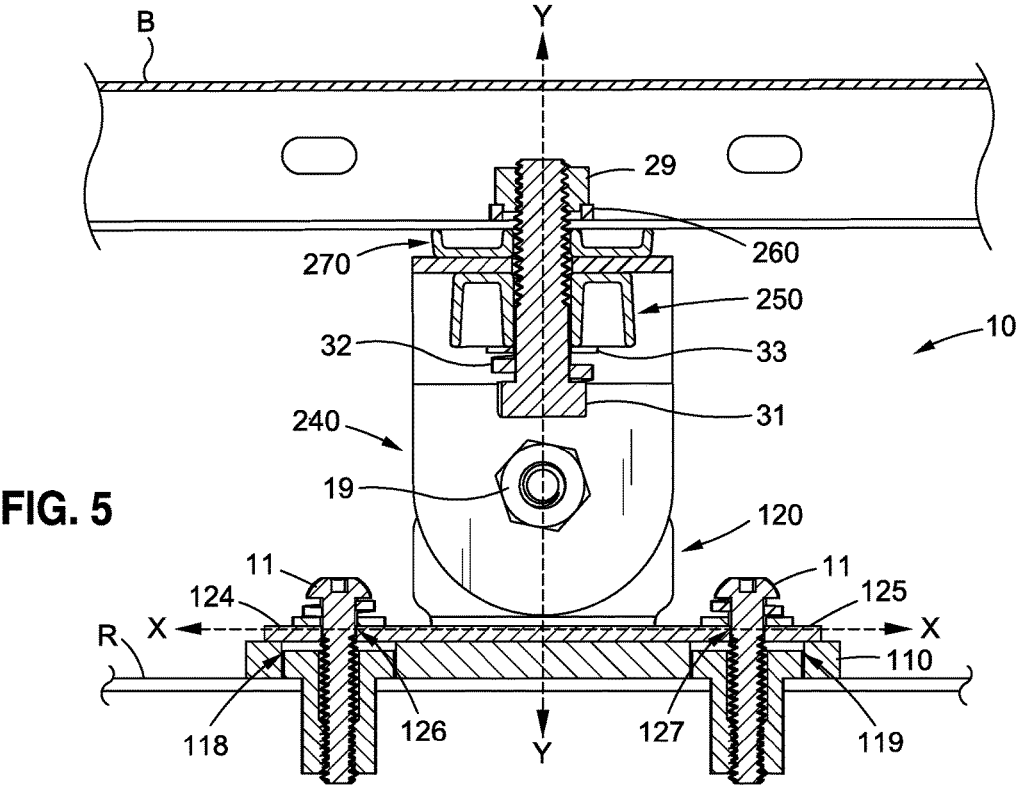
FIG. 5 is a cross-sectional view taken along the lines "5-5" of FIG. 4, illustrating the multi-axis roof-rack mounting system installed on a vehicle roof, in accordance with an embodiment the present disclosure.

The first tab portion 124 may include a first tab-portion aperture 126 (shown in FIG. 5). The second tab portion 125 may include a second tab-portion aperture 127. Those having ordinary skill in the art will recognize that the size and shape of the first tab portion 124, the first tab-portion aperture 126, the second tab portion 125, and the second tab-portion aperture 127 may be varied from the configuration depicted in FIG. 1.

The base portion 100 may include a mounting pad 110, which may be made of a flexible, resilient material, e.g., polyurethane or rubber. The mounting pad 110 may include one or more apertures, and may have any suitable thickness T. In an embodiment, as shown for example in FIG. 1, the mounting pad 110 includes a first aperture 118 arranged symmetrically with a second aperture 119. The first aperture 118 and the second aperture 119 of the mounting pad 110 may be aligned with the first tab-portion aperture 126 and the second tab-portion aperture 127, respectively. In other embodiments, the first and second apertures 118 and 119 may be arranged non-symmetrically. The form factor of the mounting pad 110 may be substantially similar to the form factor of the bracket member 120.

In an embodiment, the neck portion 200 includes a support member 240, a first saddle member 250 moveably engaged with the support member 240, a second saddle member 270 moveably engaged with the support member 240, and a clasp member 260 for engaging a rail (e.g., bar B). The first saddle member 250 and the second saddle member 270 may be formed of any of a variety of materials, including metallic and/or non-metallic materials. Those skilled in the art will recognize that the size and shape of the first saddle member 250 and the second saddle member 270 may be varied from the configuration depicted in FIG. 1. The support member 240 may be formed of any suitable high-strength material, e.g., stainless steel.

In an embodiment, the support member 240 has an inverted-U cross-section. The support member 240 may include a curved portion 241 and two opposing side portions 244 connected to and extending from the opposite ends of the curved portion 241. Each side portion 244 may include an aperture 243. In an embodiment illustrated in FIG. 1, the curved portion 241 of the support member 240 has an elongated opening 249, which is configured to allow for lateral movement (as indicated by the double-arrowed line in FIG. 2) of a central fastener 31 passing therethrough.

The apertures 243 in the side portions 244 of the support member 240 are aligned with the apertures 123 in the arm members 122 of the bracket member 120, and the support member 240 is coupled to the bracket member 120 by fasteners 15 (e.g., socket head cap screw, socket shoulder screw, or other fastener) and fastening nuts 19.

The first saddle member 250 of the neck portion 200 generally includes a first side (e.g., upper side) 251 and a second side (e.g., lower side) 252. The first side 251 of the first saddle member 250 has a curved surface 258 configured to moveably engage with an inner surface 242 of the curved portion 246 of the support member 240. The first saddle member 250 may include an aperture 253 defined by a tubular member 255 extending from the first side 251 to the second side 252. In an embodiment, the aperture 253 defined by the tubular member 255 of the first saddle member 250 is aligned with the slot 249 defined by the support member 240.

The second saddle member 270 of the neck portion 200 generally includes a first side (e.g., lower side) 271 and a second side (e.g., upper side) 272. The second side 272 has a curved surface 278 configured to moveably engage with an outer surface 241 of the curved portion 246 of the support member 240. The second saddle member 270 may include an aperture 273 defined by a tubular member 275 extending from the first side 271 to the second side 272. In an embodiment, the aperture 273 defined by the tubular member 275 of the second saddle member 270 is aligned with the slot 249 defined by the support member 240.

The second saddle member 270 may include one or more wall members 276 extending radially inward of an outer perimeter of the second side 272. The second side 272 of the second saddle member 270 may have a generally circular outer perimeter. In an embodiment, as shown for example in FIGS. 1 and 2, a plurality of wall members 276 extend between the outer perimeter of the second side 272 and the tubular member 275 of the second saddle member 270. Those having ordinary skill in the art will recognize that the wall members 276 could be implemented in other configurations.

In an embodiment, the clasp member 260 is a substantially planar structure. The clasp member 260 may be formed of any suitable high-strength material, e.g., stainless steel. One or more corners of the clasp member 260 may be rounded, e.g., to facilitate rotational movement of the clasp member 260 within a rail. In an embodiment, the clasp member 260 has aperture 263 configured to receive a central fastener 31 therethrough. Those skilled in the art will recognize that the size and shape of the clasp member 260 may be varied from the configuration depicted in FIGS. 1-5.

When a rail (e.g., bar B shown in FIGS. 2-5) is coupled between the second saddle member 270 and the clasp member 260, the rail is pivotably movable relative to the support member 120 about a central longitudinal axis Y-Y (shown in FIG. 5) of the fastener 31. In an embodiment, the bottom of the rail is moveable atop the wall members 276, which extend between the outer perimeter of the second side 272 and the tubular member 275 of the second saddle member 270.

When a rail (e.g., bar B shown in FIGS. 2-5) is coupled between the second saddle member 270 and the clasp member 260, the rail is laterally moveable (as indicated by the lower pair of double-arrowed lines in FIG. 4) relative to a plane transverse to a plane containing the longitudinal axis X-X (shown in FIG. 5) of the bracket member 120 of the base portion 100.

In an embodiment, assembly of the multi-axis roof-rack mounting system 10 includes inserting a central fastener 31 (e.g., hex head threaded fastener, or other fastener) through each of a lock washer 32, a washer 33, the aperture 253 of the first saddle member 250, the opening 249 of the support member 240, the aperture 273 of the second saddle member 270, and the aperture 263 of the clasp member 260. In an embodiment, the central fastener 31 is secured by a fastening nut 29.

Figure 4:
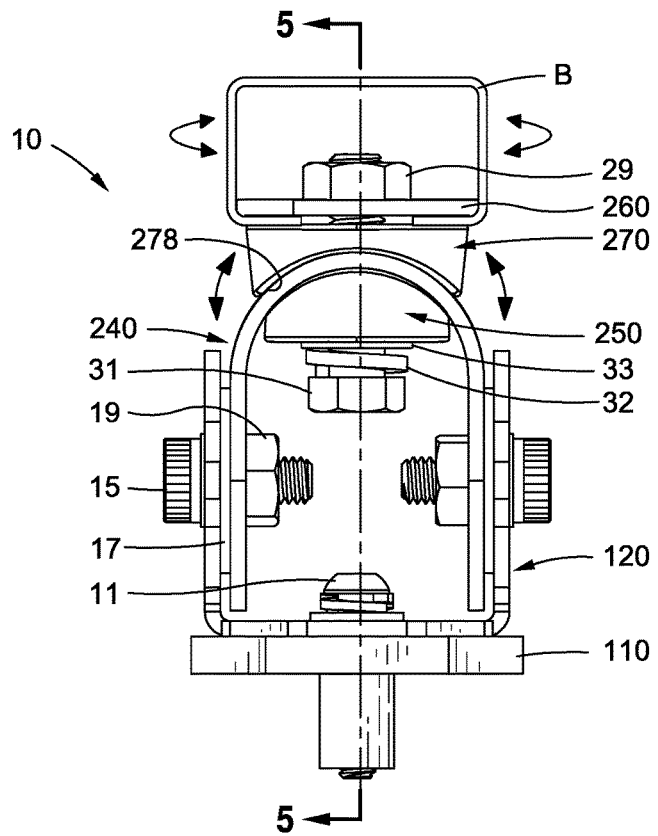
FIG. 4 is a perspective view of the multi-axis roof-rack mounting system with the mounted rail of FIG. 3 in accordance with an embodiment the present disclosure.

In an embodiment, assembly of the multi-axis roof-rack mounting system 10 includes placing washers 17 between the support member 240 of the neck portion 200 and the bracket member 120 of the base portion 100, as shown for example in FIG. 4, and fasteners 15 are inserted through each of the apertures 123 in the bracket member 120, the washers 17, and the apertures 243 in the support member 240, and the fasteners 15 are secured by fastening nuts 19.

In an embodiment, as shown for example in FIG. 5, two fasteners 11 are used to attach the base portion 100 to the vehicle roof R. In more detail, a fastener 11 is inserted through the first tab-portion aperture 126 of the bracket member 120 and through the first aperture 118 of the mounting pad 110 into a vehicle roof R, and a fastener 11 is inserted through the second tab-portion aperture 127 of the bracket member 120 and through the second aperture 119 of the mounting pad 110 into the vehicle roof R. In an embodiment, the two fasteners 11 are bolt threaded into plusnuts. Lock washers, e.g., stainless steel spring lock washers, may be used to secure the two fasteners 11 in place. It is to be understood that any suitable manner of mounting or fixedly securing the bracket member 120 to the vehicle roof R may be utilized.

In an embodiment, as shown for example in FIGS. 2-4, mounting of a rail or bar (e.g., bar B) onto the multi-axis roof-rack mounting system 10 includes the positioning of the bottom portion of the bar B in alignment with the clasp member 260, as indicated by the dashed line in FIG. 2. The clasp member 260 is received within a channel bar B, as illustratively depicted (in phantom lines) in FIG. 3. A lock washer 32 may be used to secure the fastener 33 and nut 29 in place.

Although embodiments have been described in detail with reference to the accompanying drawings for the purpose of illustration and description, it is to be understood that the disclosed systems and apparatus are not to be construed as limited thereby. It will be apparent to those of ordinary skill in the art that various modifications to the foregoing embodiments may be made without departing from the scope of the disclosure.

What is claimed is:

1. A multi-axis roof-rack mounting system, comprising:
   a base portion, including:
      a bracket member including two arm members connected to and extending upwardly from opposing lateral edges of a middle portion, the middle portion extending between a first tab portion and a second tab portion; and
   a neck portion, including:
      a support member including a curved portion having an elongate opening configured to allow lateral movement of a fastener passing through the support member;
      a first side wall extending from the curved portion;

a second side wall extending from the curved portion, the second side wall mirroring the first side wall with the curved portion extending between the first side wall and the second side wall; and a clasp member configured to be receivable within a rail;

wherein the neck portion is coupled to the base portion, and wherein the base portion is securable to a roof of a vehicle;

wherein a second saddle member and the clasp member are configured to allow a rail, when coupled therebetween, to be pivotably movable relative to the support member about a central longitudinal axis of the fastener; and wherein when a rail is coupled between the second saddle member and the clasp member, a bottom of the rail is moveable atop a plurality of wall members extending between an outer perimeter of a second side and a tubular member of the second saddle member.

2. The multi-axis roof-rack mounting system of claim 1, wherein a first saddle member has a curved surface configured to moveably engage with an inner surface of the curved portion of the support member.

3. The multi-axis roof-rack mounting system of claim 1, wherein a second saddle member has a curved surface configured to moveably engage with an outer surface of the curved portion of the support member.

4. The multi-axis roof-rack mounting system of claim 1, wherein a second saddle member and the clasp member are configured to allow a rail, when coupled therebetween, to be pivotably movable relative to the support member about a central longitudinal axis of the fastener.

5. The multi-axis roof-rack mounting system of claim 4, wherein the second saddle member includes a first side, a second side, and an aperture defined by a tubular member extending from the first side to the second side.

6. The multi-axis roof-rack mounting system of claim 5, wherein the aperture in the second saddle member is aligned with an aperture in the first saddle member.

7. The multi-axis roof-rack mounting system of claim 1, wherein a first saddle member and a second saddle member are coupled to the fastener passing through the support member.

8. The multi-axis roof-rack mounting system of claim 1, wherein the base portion further includes a mounting pad.

* * * * *